US010184343B2

(12) United States Patent
Lacy et al.

(10) Patent No.: US 10,184,343 B2
(45) Date of Patent: Jan. 22, 2019

(54) SYSTEM AND METHOD FOR TURBINE NOZZLE COOLING

(71) Applicant: General Electric Company, Schenectady, NY (US)

(72) Inventors: Benjamin Paul Lacy, Greer, SC (US); David Edward Schick, Greenville, SC (US); Sandip Dutta, Greenville, SC (US)

(73) Assignee: General Electric Company, Schenectedy, NY (US)

( * ) Notice: Subject to any disclaimer, the term of this patent is extended or adjusted under 35 U.S.C. 154(b) by 399 days.

(21) Appl. No.: 15/016,498

(22) Filed: Feb. 5, 2016

(65) Prior Publication Data
US 2017/0226892 A1 Aug. 10, 2017

(51) Int. Cl.
F01D 5/18 (2006.01)
F01D 25/12 (2006.01)
F01D 9/04 (2006.01)

(52) U.S. Cl.
CPC ............ *F01D 5/189* (2013.01); *F01D 9/041* (2013.01); *F01D 25/12* (2013.01); *F05D 2220/32* (2013.01); *F05D 2230/22* (2013.01); *F05D 2240/128* (2013.01); *F05D 2240/30* (2013.01); *F05D 2260/201* (2013.01); *F05D 2260/2214* (2013.01); *F05D 2300/17* (2013.01); *F05D 2300/171* (2013.01)

(58) Field of Classification Search
None
See application file for complete search history.

(56) References Cited

U.S. PATENT DOCUMENTS

| 6,237,344 | B1 | 5/2001 | Lee |
| 8,127,553 | B2 | 3/2012 | Ekkad et al. |
| 8,137,056 | B2 | 3/2012 | Fujimoto et al. |
| 8,444,376 | B2 | 5/2013 | Krueckels et al. |
| 8,794,006 | B2 * | 8/2014 | Chokshi .................. F23R 3/06 60/752 |

(Continued)

FOREIGN PATENT DOCUMENTS

| EP | 0 698 725 A2 | 2/1996 |
| EP | 2256297 B1 | 5/2012 |

(Continued)

OTHER PUBLICATIONS

Extended European Search Report and Opinion issued in connection with corresponding EP Application No. 17154676.5 dated Jun. 21, 2017.

*Primary Examiner* — David E Sosnowski
*Assistant Examiner* — Juan G Flores
(74) *Attorney, Agent, or Firm* — Charlotte C. Wilson; Ernest G. Cusick; Frank A. Landgraff

(57) ABSTRACT

A system having an impingement sleeve configured to receive a cooling flow is provided. The impingement sleeve includes a column of ports extending from an outer surface of the impingement sleeve, wherein each port of the column of ports is configured to direct an impingement stream toward a heated structure, and each impingement stream includes a portion of the cooling flow. Further, one or more pins are disposed outside the outer surface relative to the cooling flow, wherein each pin of the one or more pins is coupled between pairs of ports of the column of ports.

20 Claims, 7 Drawing Sheets

(56) References Cited

U.S. PATENT DOCUMENTS

2012/0297784 A1* 11/2012 Melton .................. F23R 3/002
 60/772
2016/0348536 A1   12/2016  Lacy et al.
2017/0067363 A1   3/2017   Lacy et al.
2017/0067636 A1   3/2017   Lacy et al.
2017/0067699 A1   3/2017   Lacy et al.

FOREIGN PATENT DOCUMENTS

EP    2 716 868 A2    4/2014
EP    2 975 217 A1    1/2016

* cited by examiner

SYSTEM AND METHOD FOR TURBINE NOZZLE COOLING

BACKGROUND

The subject matter disclosed herein relates generally to gas turbines, and, more particularly to systems and methods for cooling of turbine nozzles.

A gas turbine engine combusts a fuel to generate hot combustion gases, which flow through a turbine to drive a load and/or a compressor. In such system, the overall gas turbine performance and efficiency may be increased by increasing internal combustion temperatures. The components that are subject to the high temperatures in the hot gas path (e.g., hot gas path components) may be cooled by routing cooling air from the compressor or elsewhere through impingement sleeves that impinge the flow of the cooling air on the inner surfaces of the hot gas path components. Although the use of this method may provide cooling for the hot gas path components, a further increase in cooling efficiency is desired.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system including an impingement sleeve configured to receive a cooling flow. The impingement sleeve includes a column of ports extending from an outer surface of the impingement sleeve, wherein each port of the column of ports is configured to direct an impingement stream toward a heated structure, and each impingement stream includes a portion of the cooling flow. The impingement sleeve also includes one or more pins disposed outside the outer surface relative to the cooling flow, wherein each pin of the one or more pins is coupled between pairs of ports of the column of ports.

In another embodiment, a system includes an additively manufactured impingement sleeve configured to receive a cooling flow. The impingement sleeve includes a build axis substantially perpendicular to a plurality of layers forming the additively manufactured impingement sleeve. The impingement sleeve also includes a plurality of ports extending from an outer surface of the impingement sleeve, wherein the plurality of ports includes a plurality of port columns. Each port of the plurality of ports is configured to direct an impingement stream toward a heated structure, and each impingement stream includes a portion of the cooling flow. The impingement sleeve further includes a plurality of pins disposed outside the outer surface relative to the cooling flow. Each port column includes one or more pins of the plurality of pins coupled between pairs of ports of the plurality of ports along the respective port column to support the respective port column during additive manufacturing. Each pin of the plurality of pins is disposed along a respective pin axis within a threshold angle of the build axis.

In another embodiment, a method includes additively manufacturing the impingement sleeve in a build direction, wherein the impingement sleeve includes an outer surface, and a plurality of ports extending from the outer surface at angles greater than 45 degrees relative to the build direction. Each port of the plurality of ports is configured to direct an impingement stream toward a heated structure. The impingement sleeve also includes a plurality of pins, wherein each pin of the plurality of pins is disposed along a respective pin axis within a threshold angle of the build direction. Each pin of the plurality of pins is coupled to at least one port of the plurality of ports, and each pin of the plurality of pins is configured to support the at least one port during additive manufacturing. The method also includes inserting the additively manufactured impingement sleeve in a nozzle of a gas turbine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
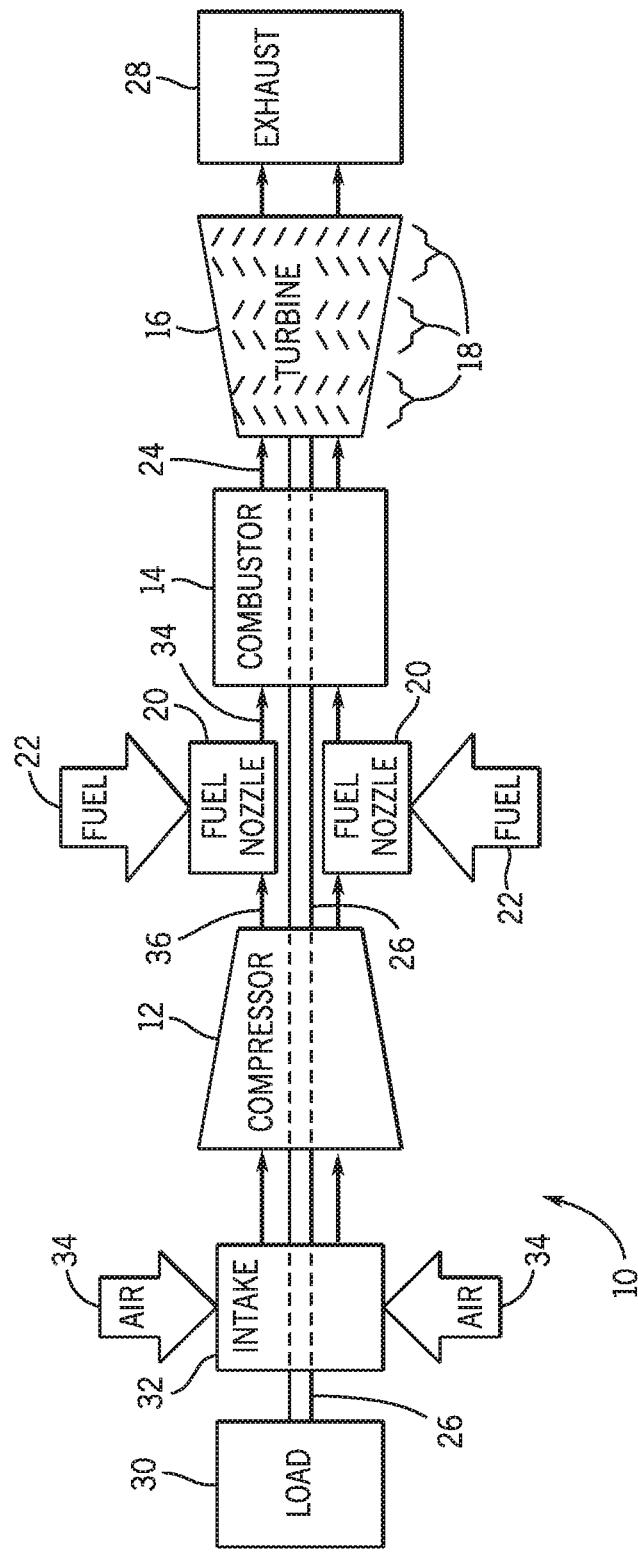
FIG. 1 is a block diagram of an embodiment of a gas turbine system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Gas turbine systems in accordance with the present disclosure may provide cooling within a turbine section of a gas turbine system with types of hardware, such as impingement sleeves. Certain gas turbine systems may include impingement sleeves positioned within heated parts (e.g., airfoils) or impingement sleeves positioned adjacent to casings of the heated parts of the gas turbine. Impingement cooling operates by impinging (e.g., hitting) the inner surface of the heated component with high velocity cooling air. Impingement cooling allows more heat to be transferred by convection (e.g., than regular convection cooling does), and impingement cooling is often used in regions of great heat load, such as the turbine blades and turbine nozzles. For example, the turbine blades or airfoils of other heated components of the turbine may be hollow with one or more cavities, and the impingement sleeves may be inserted within those cavities.

Some embodiments of impingement sleeves for impingement cooling may include holes or air outlets for the cooling air to exit and impinge the inner surface of the heated structures. However, depending on the conformation between the impingement sleeve and the inner surface of the heated structures, it may be difficult to control the impingement distance (e.g., distance from the air outlet to the inner surface). Furthermore, it may be difficult to direct the cooling air to tight-to-reach spots of the heated structure. For example, the heated structure may have narrow corners or sharp transitions at the respective surface contour such that it is difficult for the impingement sleeve to conform with such shape so as to effectively direct the air to cool the inner surface. Accordingly, there is a desire for impingement sleeves that provide effective cooling of the heated structures of the gas turbine system. For example, the systems described herein may enable control of the impingement distance and control of directing cooling air to desirable spots of the heated structure, and thus may improve the cooling efficiency of the impingement sleeves.

Turning to the drawings, FIG. 1 illustrates a block diagram of an embodiment of a gas turbine system 10, which may include features (e.g., cooling features such as impingement sleeves) to improve cooling within certain portions of the system 10. As appreciated, the systems and methods described herein may be used in any turbine system, such as gas turbine systems and steam turbine systems, and is not intended to be limited to any particular machine or system. As shown, the system 10 includes a compressor 12, a turbine combustor 14, and a turbine 16, wherein the turbine 16 may include one or more separate stages 18. The system 10 may include one or more combustors 14 that include one or more fuel nozzles 20 configured to receive a liquid fuel and/or gas fuel 22, such as natural gas or syngas.

The turbine combustors 14 ignite and combust a fuel-air mixture, and then pass hot pressurized combustion gases 24 (e.g., exhaust) into the turbine 16. Turbine blades are coupled to a shaft 26, which is also coupled to several other components throughout the gas turbine system 10. As the combustion gases 24 pass through the turbine blades in the turbine 16, the turbine 16 is driven into rotation, which causes the shaft 26 to rotate. Eventually, the combustion gases 24 exit the gas turbine system 10 via an exhaust outlet 28. Further, the shaft 26 may be coupled to a load 30, which is powered via rotation of the shaft 26. For example, the load 30 may be any suitable devices that may generate power via the rotational output of the gas turbine system 10, such as an electrical generator, a propeller of an airplane, and so forth.

Compressor blades may be included as components of the compressor 12. The blades within the compressor 12 are coupled to the shaft 26, and will rotate as the shaft 26 is driven to rotate by the turbine 16, as described above. An intake 32 feeds air 34 into the compressor 12, and the rotation of the blades within the compressor 12 compresses the air 34 to generate pressurized air 36. The pressurized air 36 is then fed into the fuel nozzles 20 of the turbine combustors 14. The fuel nozzles 20 mix the pressurized air 36 and fuel 22 to produce a suitable mixture ratio for combustion (e.g., a combustion that causes the fuel to more completely burn).

Figure 2:
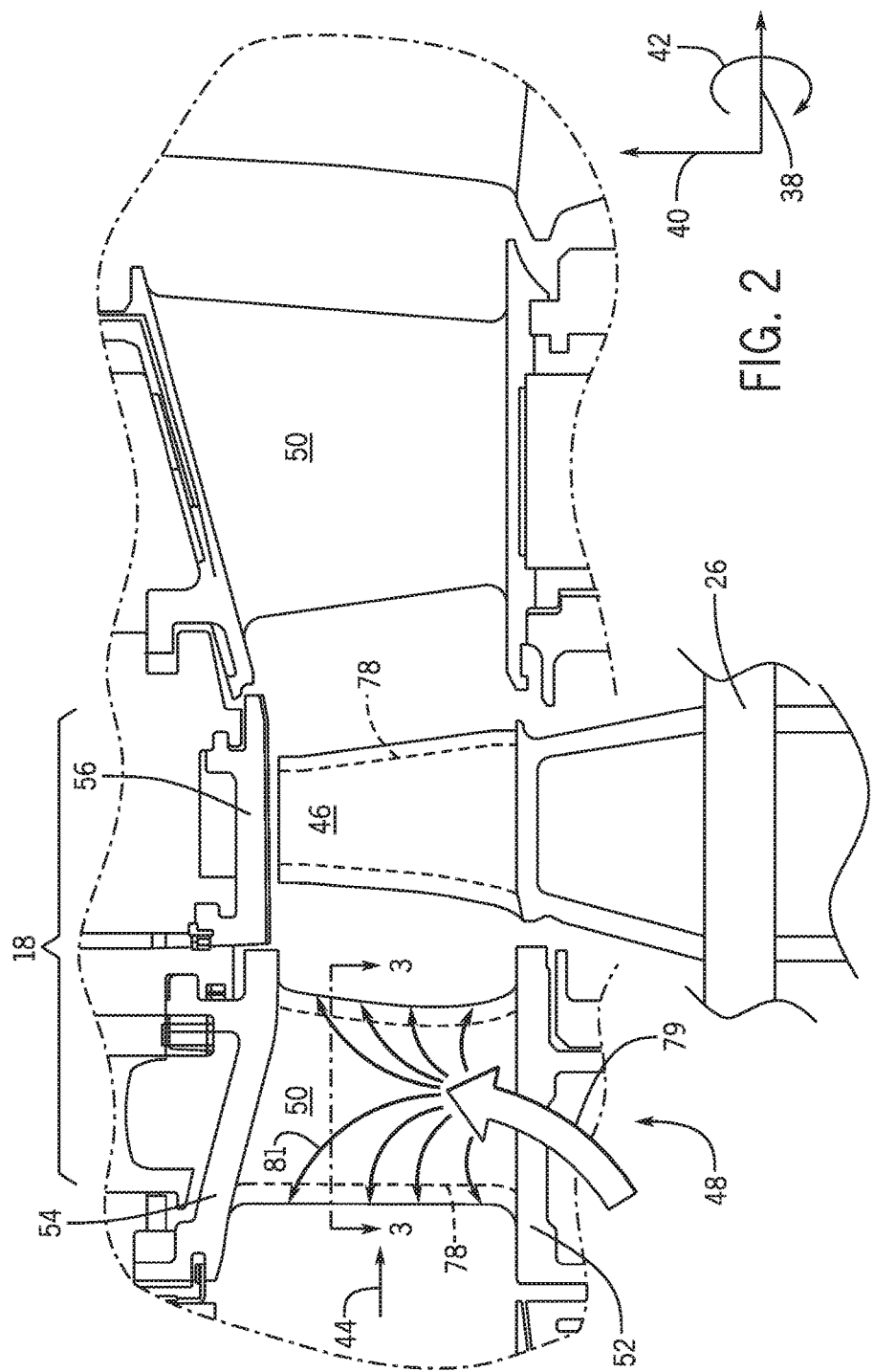
FIG. 2 is a partial side cross-sectional view of the gas turbine system.

FIG. 2 is a partial cross-sectional side view of an embodiment of the gas turbine system 10. As shown, the gas turbine system 10 may be described with reference to a longitudinal axis or direction 38, a radial axis or direction 40, and a circumferential axis or direction 42. The hot combustion gases 24 may flow from the combustors 14 (FIG. 1) into the turbine 16 in a direction generally along the longitudinal axis 38, illustrated by an arrow 44. Each of the stages 18 of the turbine 16 includes a set of blades 46 coupled to a rotor wheel that may be rotatably attached to the shaft 26. The turbine 16 includes turbine nozzle assemblies 48 within each of the stages 18, and the turbine nozzle assemblies 48 direct the hot combustion gases 24 towards the set of blades 46 of the respective stage 18. The turbine nozzle assemblies 48 described herein may be employed in a first stage, second stage, third stage, or combinations thereof. Each nozzle assembly 48 may include circumferentially spaced vanes 50 that extend in the radial direction 40 between inner and outer band segments 52 and 54. Adjacent outer band segments 54 may be coupled together to form an outer annular ring extending around an inner annular ring of adjacent inner band segments 52. The vanes 50 may extend between the two annular rings formed by the inner and outer band segments 52 and 54. The gas turbine system 10 may also include shroud segments 56, which may be disposed downstream of the outer band segments 54 to direct hot combustion gases 24 flowing past the vanes 50 to the blades 46. As may be appreciated, the term "downstream" generally refers to the direction of the combustion gases 24 through the turbine 16 along the longitudinal axis 38, as shown by the arrow 44. Likewise, the term "upstream" generally refers to the opposite direction (e.g., towards the compressor 12) along the longitudinal axis 38.

Structures or components disposed along the flow path of a hot gas (e.g., the combustion gases 24) may be referred to as heated structures or components. In one example, the heated structure may be the blades 46 and other parts (e.g., vanes 50) of the turbine nozzle assembly 48. In some embodiments, to cool the heated structures (e.g., vanes 50), one or more impingements sleeves 92 may be disposed within the heated structures as shown by the dashed line 78. For example, cooling air as indicated by an arrow 79 may be routed from the compressor 12 or elsewhere through impingements sleeves 92, which impinge the flow of cooling air as indicated by arrows 81 on the inner surfaces of the heated structures.

Figure 3:
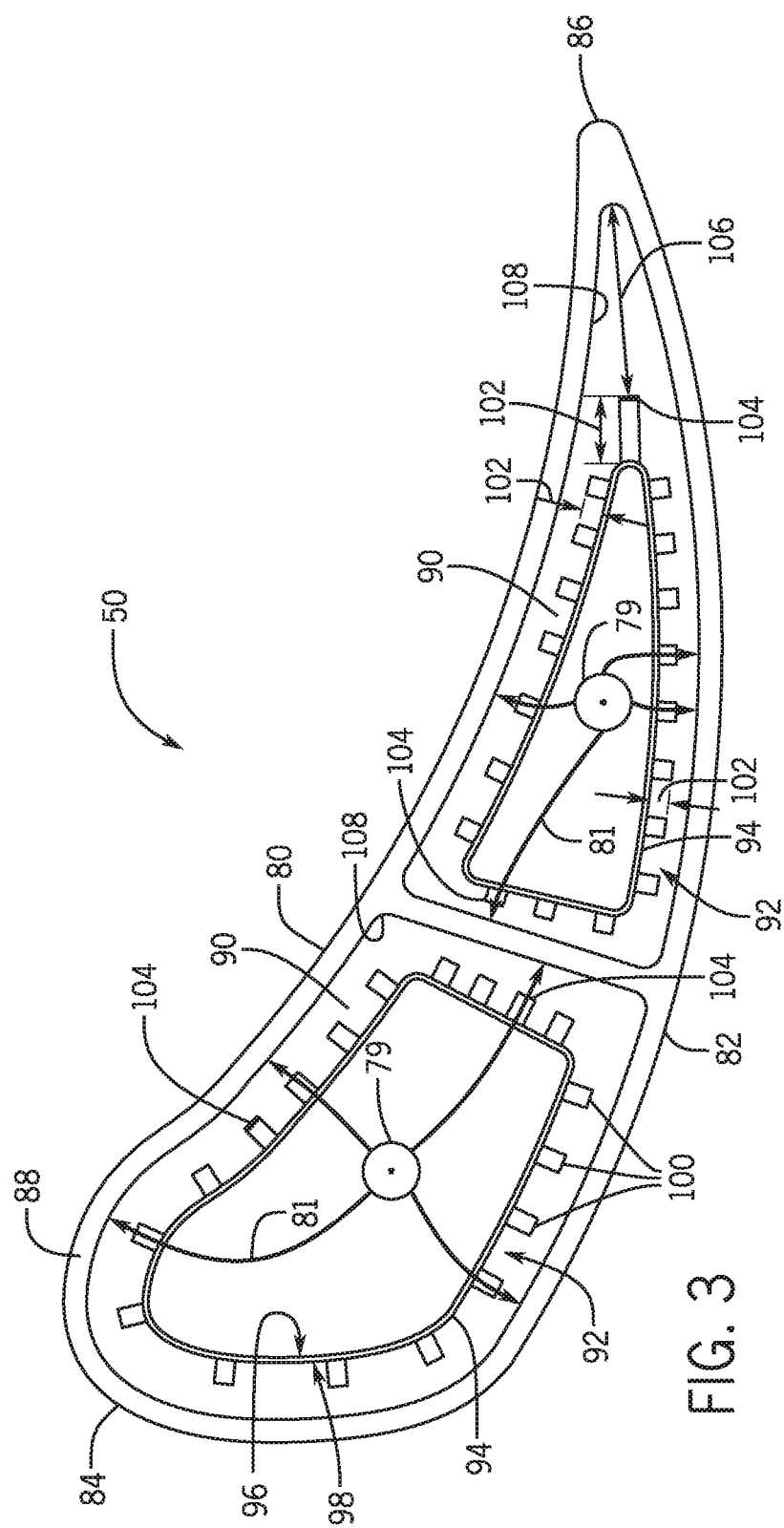
FIG. 3 is a cross-sectional view of an embodiment of airfoil heated structure of the gas turbine system with an impingement sleeve.

FIG. 3 shows a sectional view of an example of a heated structure (e.g., vane 50), taken along line 3-3 of FIG. 2. The heated structure may have an overall aerodynamic shape (e.g., airfoil), extending from a pressure side 80 to a suction side 82. The heated structure (e.g., vane 50) may also extend from a leading edge 84 to a trailing edge 86. The heated structure may have a shell 88, which defines one or more internal cooling cavities 90. The heated structure may be cooled by passing cooling air through passages internal to the heated structure (e.g., convection cooling). For example, a portion of air 34 (FIG. 1) may be diverted from the compressor 12 to flow through the one or more internal cooling cavities 90 of the heated structure (e.g., vane 50) as indicated by the arrow 79. Further, one or more impingement sleeves 92 may be disposed within the one or more internal cooling cavities 90 to cool the heated structure via impingement cooling on the shell 88 as indicated by the arrows 81.

The impingement sleeve 92 may have a shell 94, and the shell 94 may have an inner surface 96, and an outer surface 98. The outer surface 98 of the impingement sleeve 92 may enclose a cooling channel configured to receive cooling air. Further, the impingement sleeve 92 may have a plurality of ports 100 extending from the outer surface 98 away from the inner surface 96. The plurality of ports 100 may each have a length 102 and an outlet 104, and there may be a distance 106 from the outlet 104 to a wall 108 of the shell 88 that forms the internal cooling cavity 90. In some embodiments, the outer surface 98 of the impingement sleeve 92 may be generally parallel to the wall 108 of the corresponding internal cooling cavity 90.

As set forth above, the outer surface 98 of the impingement sleeve 92 may enclose a cooling channel configured to receive cooling air (the arrows 79 and 81 of FIG. 2). The cooling air may flow through the inner surface 96 of the impingement sleeve 92, and may exit through the plurality of ports 100 from the respective outlet 104 (as shown by the arrows 81), hitting/impinging the wall 108 of the internal cooling cavity 90 with high velocity air (e.g., impingement cooling). This allows more heat to be transferred by convection from the shell to the cooling air, and thereby enhances the cooling of the heated structure (e.g., vane 50). In one example, the cooling air exiting the outlet 104 of each of the plurality of ports 100 (e.g., each impingement stream) may be directed at a substantially perpendicular angle toward the wall 108. The length 102 of each port 100 may vary among the plurality of ports 100 so as to control the respective distance 106 between the respective outlet 104 and the wall 108 of the internal cooling cavity 90 (e.g., to allow for control of the distance of impingement to the wall 108). For example, the length 102 may be the same for each of the plurality of ports 100, or the length 102 may vary for different ports of the plurality of ports 100. In some embodiments, the length 102 of the ports 100 may vary to enable the distances 106 between each respective port 104 and the wall 108 to be approximately equal. Varying lengths 102 of the ports 100 may allow the cooling air to be carried to tight-to-reach areas, such as near the trailing edge 86 of the heated structure. As may be appreciated, directing cooling air toward the wall 108 of the trailing edge 86 may be difficult without the ports 100 described herein.

Figure 4:
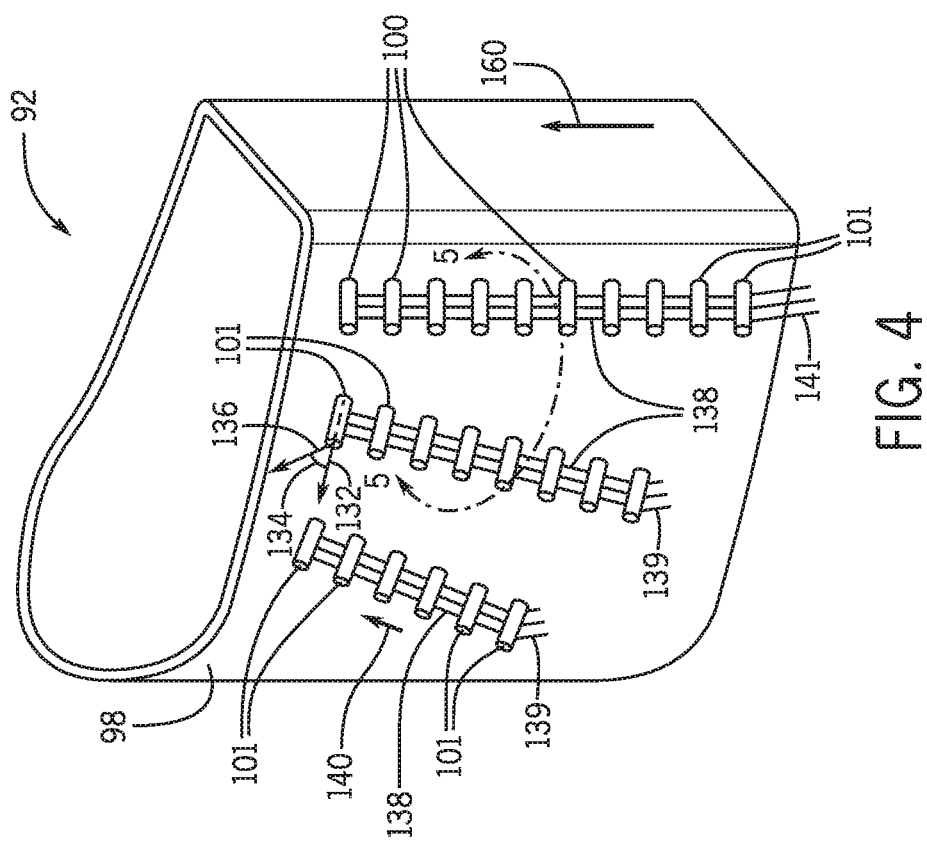
FIG. 4 is a perspective view of an embodiment of the impingement sleeve with a plurality of ports.

FIG. 4 is a perspective view of an embodiment of the impingement sleeve 92 with the plurality of ports 100. Each of the plurality of ports 100 may have a port axis or direction 132, which is aligned with the longitudinal direction of the port 100, and the port axis 132 may be at an angle 134 relative to a surface tangent 136 of the outer surface 98 of the impingement sleeve 92. The angle 134 may be a constant value for all of the plurality of ports 100, or the angle 134 may vary between different ports of the plurality of ports 100. In one example, the angle 134 may be 90 degrees (e.g., the port 100 is perpendicularly aligned relative to the outer surface 98 of the impingement sleeve 92). In another example, the angle 134 may be any values between 0 and 180 degrees. Further, there may be one or more pins 138 between each pair 101 of the plurality of ports 100. In some embodiments, there may be one or more pins 139 between the outer surface 98 of the impingement sleeve 92 and the plurality of ports 100. For example, one end of the pin 138 may be connected to the port 100, and the other end may be connected to the outer surface 98 of the impingement sleeve 92. In addition, there may also be one or more pins 141 between the plurality of ports 100 and a ground. One may appreciate that the term "ground," as discussed herein, may refer to a base surface upon which an initial layer of an additively manufactured component is added. The one or more pins 138 may provide structural support for the plurality of ports 100 during the construction/building of the plurality of ports 100 so as to enable the plurality of ports 100 to be oriented at any angles 134 relative to the outer surface 98 of the impingement sleeve 92. Each of the one or more pins 138 may have a pin axis or direction 140, which is aligned with the longitudinal direction of the pin 138. The pin axis 140 of each of the one or more pins 138 may be substantially parallel to the outer surface 98 of the impingement sleeve 92 at a location proximate to the respective pin of the plurality of pins 138, such that each pin 138 substantially follows the contour of the outer surface 98 of the impingement sleeve 92. In some embodiments, the pin axis 140 of each of the one or more pins 138 may be at an angle (e.g., approximately 45 degrees or smaller than 45 degrees) relative to the outer surface 98 of the impingement sleeve 92.

Figure 5:
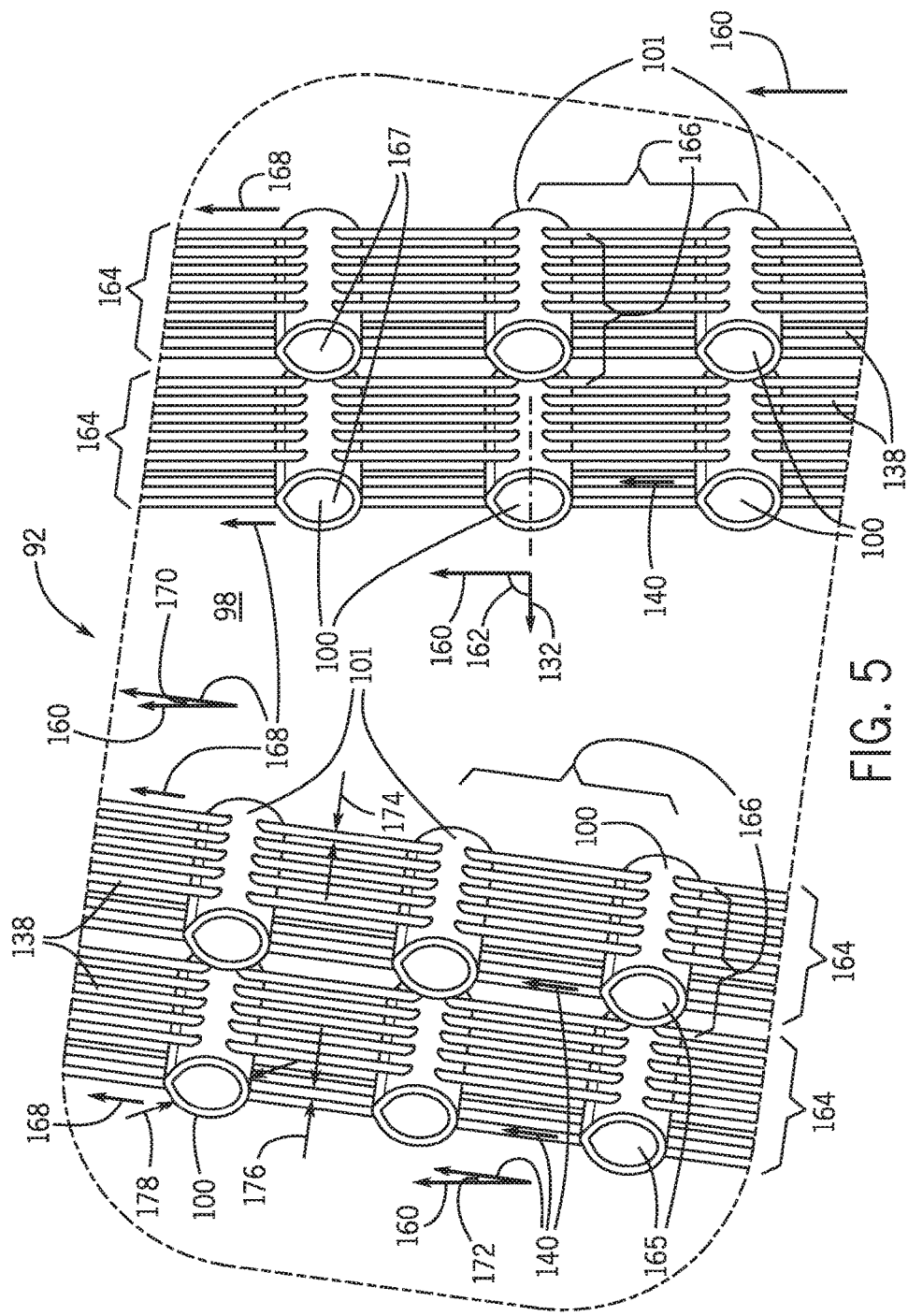
FIG. 5 is a partial perspective view of an embodiment of a portion of the impingement sleeve of FIG. 4 with the plurality of ports.

FIG. 5 is a detailed perspective view of portion of the plurality of ports 100 with the one or more pins 138 between each pair 101 of the plurality of ports 100 shown in FIG. 4. In some embodiments, the impingement sleeve 92 including the plurality of ports 100 and the one or more pins 138 is built using an additive manufacturing technique such as a direct metal laser sintering (DMLS) process, wherein the impingement sleeve 92 may include any suitable laser sintered metal material (e.g., stainless steel, nickel-chromium alloy, cobalt-chromium alloy, maraging steel, aluminum alloy, titanium alloy, etc.). The impingement sleeve 92 including the plurality of ports 100 and the one or more pins 138 may also be built using any other additive manufacturing techniques, such as 3D-printing, wherein the impingement sleeve 92 may include any suitable metal materials for the said additive manufacturing technique. The impingement sleeve 92 built using a DMLS process or other additive manufacturing technique may have a build axis or direction 160 (e.g., opposite to the direction as the build material is laid down).

Each of the plurality of ports 100 may have the port axis 132 at an angle 162 relative to the build axis 160, wherein the angle 162 may be approximately 90 degrees, greater than 45 degrees, or any other angles between 0 and 90 degrees. The plurality of ports 100 may be distributed so as to form one or more columns 164 of ports. There may be a space 166 between adjacent ports of the plurality of ports 100. In one example, the space 166 may be constant for every adjacent port of the plurality of ports 100 (e.g., the plurality of ports 100 are equally spaced). In another example, the space 166 may vary for some or all of the plurality of ports 100 (e.g., the plurality of ports 100 are not equally spaced). For example, the space 166 between the ports 100 of a column 164 may be different than the space 166 between two columns 164. Additionally, or in the alternative, the space 166 between ports 100 directed toward a trailing edge of the heated structure may be different (e.g., less than) the space 166 between ports 100 directed toward a broad face of the heated structure.

Further, each of the one or more columns 164 may have a column direction (as shown by arrow 168). The column direction 168 may be aligned with the build axis 160. The column direction 168 may also be at an angle 170 relative to the build direction 160, wherein the angle 170 may be between 0 and 90 degrees. In some embodiments, the angle 170 for each of the columns 164 may result in columns 164 that are helically arranged about the outer surface 98, as shown with ports 165 of FIG. 5. In one example, the angle 170 may be the same for each of the one or more columns 164 of the plurality of ports 100. For example, the ports 167 of FIG. 5 are arranged with the build axis 160 such that the angle 170 is 0 degrees. In another example, the angle 170 may vary for different columns of the one or more columns 164 of the plurality of ports 100. Each of the one or more pins 138 may have the pin axis 140 at an angle 172 relative to the build axis 160, wherein the angle 172 may be any angles within a threshold support angle of the build axis 160. In some embodiments, the one or more pins 138 may have the pin axis 140 at an angle relative to the outer surface 98 of the impingement sleeve 92, wherein the angle may be within a threshold support angle of the build axis 160. For example, the one or more pins 138 may be built with the pin axis 140 at an approximately 45 degrees or smaller than 45 degrees relative to the outer surface 98 of the impingement sleeve 92. That is, the one or more pins 138 may be built off the outer surface 98 of the impingement sleeve 92 rather than being built axially from the ground up or off the previous port 100. One may appreciate that the term "ground," as discussed herein, may refer to a base surface upon which an initial layer of an additively manufactured component is added. As may be appreciated, a threshold support angle is a critical angle relative to the build axis 160, such that structures/features or DMLS layers laid down at any angles smaller than the critical angle can withstand (e.g., without settling or sagging) on their own without any additional supports. The said threshold support angle of the build axis may be approximately 45 degrees. The one or more pins may have any cross-sectional shapes (e.g., circular, elliptical, rectangular, hexagonal). Each of the one or more pins 138 may also have a characteristic width 174. The characteristic width 174 may be approximately 1.0, 0.5, 0.25, 0.2 millimeters, or less. As may be appreciated, each of the one or more pins 138 may has a cross-sectional area (e.g., perpendicular to the pin axis 140), which has a shape of a circle, a square or rectangular, or any other shapes.

There may be a space 176 between each adjacent pin of the one or more pins 138 coupled between each pair 101 of the plurality of ports 100. In one example, the space 176 may be a constant value for each pair of the one or more pins 138 (e.g., the one or more pins 138 are equally spaced). For example, the space 176 between adjacent pins 138 may be a constant value (e.g., approximately 0.2 to 3.0 mm, or 0.2 to 1.0 mm), and the pins 138 adjacent to the outer surface 98 may be offset by the space 176. In some embodiments, the pin axis 140 is substantially parallel (e.g., within 10 degrees of parallel) to the outer surface 98 of the impingement sleeve 92 and offset by the space 176. The space 176 may be based at least in part on the build material, the angle 172, or any combination thereof. The space 176 may be configured to reduce or eliminate any settling or sagging of the port 100 during the formation of the impingement sleeve 92, thereby enabling the port 100 to have a desired shape and length 102. In some embodiments, the space 176 may vary for different pairs of the one or more pins 138 (e.g., the one or more pins 138 are not equally spaced).

Each of the plurality of ports 100 may also have a characteristic width 178. The characteristic width 178 may be the same or different for each of the plurality of ports 100. For example, the characteristic width 178 for each of the plurality of ports 100 is chosen to have certain cross-sectional area of the respective port 100 so as to achieve the designed heat transfer characteristics, cooling performance, cooling air flow volumes, cool air flow rates, cooling air flow patterns, or combinations thereof. Accordingly, the space 176 between each adjacent one or more pins 138 may be approximately 0.5 times the characteristic width 178 of the respective pair of ports 100. The length 102 of any of the plurality of ports 100 may be longer than 0.5 times its respective characteristic width 178. In another example, the length 102 of any of the plurality of ports 100 may be longer than its respective characteristic width 178.

Figure 8:
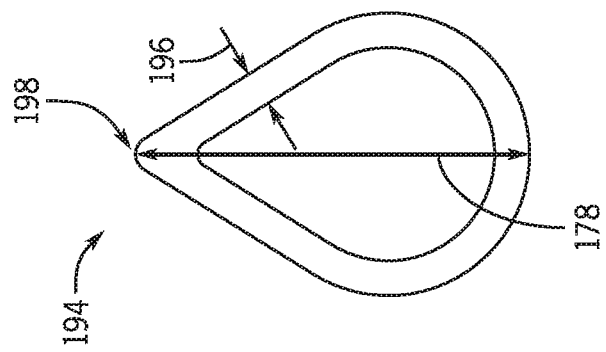
FIG. 8 is a cross-sectional view of another embodiment of one of the plurality ports of FIG. 5.
Figure 7:
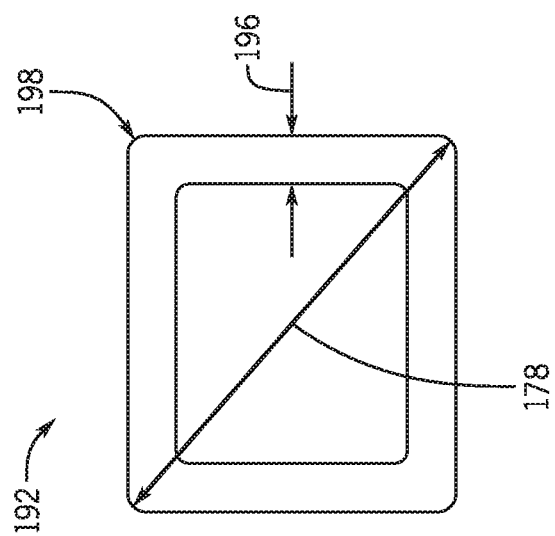
FIG. 7 is a cross-sectional view of another embodiment of one of the plurality ports of FIG. 5.
Figure 6:
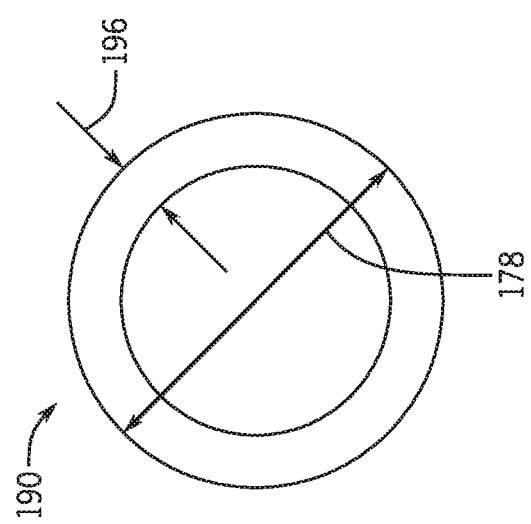
FIG. 6 is a cross-sectional view of an embodiment of one of the plurality ports of FIG. 5.

FIGS. 6-8 are cross-sectional views of different embodiments of the plurality of ports 100 perpendicular to the port axis 132. As shown, each of the plurality of ports 100 may have a hollow cross section that generally has a shape of a circle 190, a square or rectangular 192, a teardrop 194, or any other shapes. As may be appreciated, the characteristic width 178 is the diameter of the circular shape 190, the diagonal or edge length of the rectangular shape 192, or the major axis of the teardrop shape 194. Each of the plurality of ports 100 may have a thickness 196 of any suitable values, smaller than the characteristic width 178. In some embodiments, the thickness 196 and the characteristic width 174 may have the same value, and which could be the smallest resolution of a DMLS machine or a 3D printer. In some embodiment, each of the plurality of ports 100 may have one or more tapered edges 198. It may be appreciated that some embodiments of the impingement sleeve 92 and the ports 100 may have different cross sections than those illustrated in FIGS. 3-8. For example, the impingement sleeves and impingement tubes (e.g., ports) may have the shapes or cross sections of those illustrated and described in U.S. patent application Ser. No. 14/725,374, entitled "Article, Component, and Method of Forming an Article," filed on May 29, 2015, which is hereby incorporated by reference into the present disclosure.

Figure 9:
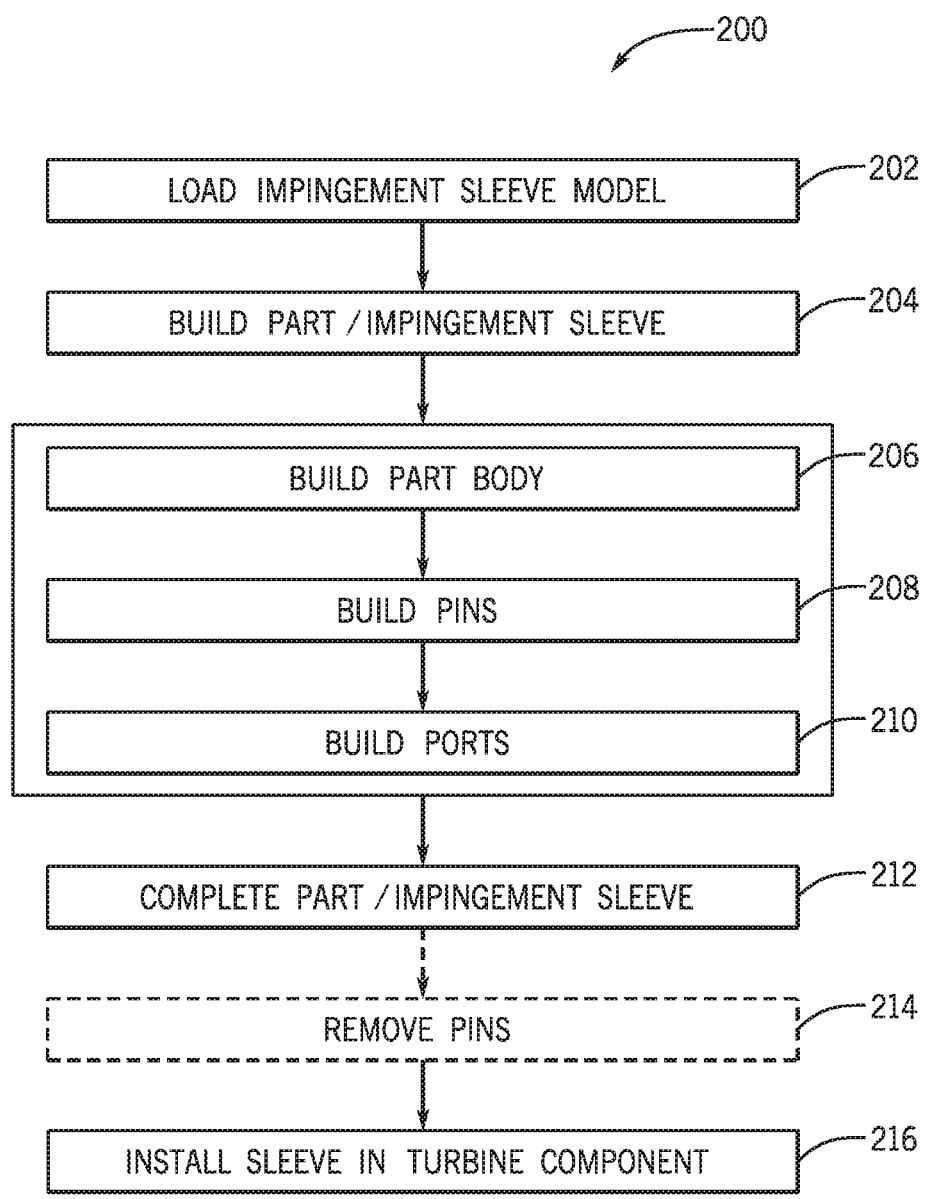
FIG. 9 is a flow chart of a method for building and implementing the impingement sleeve.

FIG. 9 is a flow chart illustrating a method 200 for building and implementing the impingement sleeve 92. One or more of the steps of the method 200 may be executed. The method 200 includes loading (block 202) the computer model (e.g., a three-dimensional (3D) computer-assisted-design (CAD) model) of the impingement sleeve 92 to the manufacturing system (e.g., a DMLS machine or a 3D printer). The method 200 also includes building (block 204) the physical part (e.g., the impingement sleeve 92) based on the loaded 3D CAD file, wherein the DMLS machine builds the impingement sleeve 92 in a layer-by-layer manner in the build direction. For example, such a process may include building (block 206) part or parts of the main body (e.g., shell 94) of the impingement sleeve 92, then building (block 208) the one or more pins 138, followed by building (block 210) the plurality of ports 100. Steps described in blocks 206 to 210 are repeated for each layer until the entire impingement sleeve 92 is built. As may be appreciated, steps 206, 208, and 210 may be concurrent or sequential in any combination of orders (e.g., the part body, pins and ports may be built concurrently or in any combination of orders depending on the sleeve structure to be built within each build layer. That is, some layers may add to only the part body, and some layers may add to the part body, the pins, and the ports. As the last layer is built and the impingement sleeve 92 is cooled and solidified, the building of the impingement sleeve 92 is completed (block 212). Optionally, the one or more pins 138 may be removed (block 214) such that the plurality of ports 100 are supported by the shell 94 without the pins 138. The method 190 method also includes installing (block 216) the impingement sleeve 92 in the heated structure (e.g., nozzle, blade) of the turbine stage 18.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
an impingement sleeve configured to receive a cooling flow, wherein the impingement sleeve comprises:
a shell having an inner surface and an outer surface, the inner surface defining a cavity;
a plurality of ports extending radially outward from the outer surface of the impingement sleeve, the plurality of ports being arranged in a column, wherein each port of the plurality of ports is configured to direct an impingement stream from the cavity toward a heated structure, and each impingement stream comprises a portion of the cooling flow; and
one or more pins disposed outside the outer surface, wherein each pin of the one or more pins is coupled to at least one port of the plurality of ports.

2. The system of claim 1, wherein the impingement sleeve comprises an additive manufactured impingement sleeve having a build axis, wherein each pin of the one or more pins is aligned along a respective pin axis that is within a threshold support angle of the build axis.

3. The system of claim 2, wherein one or more ports of the plurality of ports extends from the outer surface at approximately 90 degrees relative to the build axis.

4. The system of claim 2, wherein the additive manufactured impingement sleeve comprises a laser sintered metal material.

5. The system of claim 1, wherein the one or more pins comprises an array of pins coupled between pairs of ports of the plurality of ports.

6. The system of claim 5, wherein an inner layer of pins of the array pins coupled between a respective pair of ports of the plurality of ports is spaced within approximately 0.5 times a diameter of the ports of the respective pair of ports, wherein the inner layer of pins is nearer to the outer surface than other pins of the array of pins.

7. The system of claim 1, wherein a first port of the plurality of ports extends from the outer surface more than a diameter of the first port.

8. The system of claim 1, wherein the outer surface of the impingement sleeve encloses a cooling channel configured to receive the cooling flow.

9. The system of claim 1, comprising the heated structure, wherein the heated structure comprises a nozzle of a gas turbine, wherein the impingement sleeve is disposed within a cavity of the nozzle, and each impingement stream is directed toward an interior surface of the nozzle.

10. The system of claim 9, wherein each impingement stream is directed at a substantially perpendicular angle toward the interior surface of the nozzle.

11. The system of claim 1, wherein each pin of the one or more pins comprises a characteristic width less than approximately 0.25 mm.

12. A system comprising:
an additively manufactured impingement sleeve configured to receive a cooling flow, wherein the impingement sleeve comprises:
a build axis substantially perpendicular to a plurality of layers forming the additively manufactured impingement sleeve;
a plurality of ports extending from an outer surface of the impingement sleeve, wherein the plurality of ports comprises a plurality of port columns, each port of the plurality of ports is configured to direct an impingement stream toward a heated structure, and each impingement stream comprises a portion of the cooling flow; and
a plurality of pins disposed outside the outer surface relative to the cooling flow, wherein each port column comprises one or more pins of the plurality of pins coupled to at least one port of the plurality of ports along the respective port column to support the respective port column during additive manufacturing, and each pin of the plurality of pins is disposed along a respective pin axis within a threshold support angle of the build axis.

13. The system of claim 12, wherein a subset of ports of the plurality of ports extends more than a diameter of the subset of ports, and the subset of ports of the plurality of ports extends from the outer surface at angles greater than 45 degrees relative to the build axis.

14. The system of claim 12, wherein the pin axis of each pin of the plurality of pins is substantially parallel to the outer surface of the impingement sleeve proximate to the respective pin of the plurality of pins.

15. The system of claim 12, wherein the additive manufactured impingement sleeve comprises a laser sintered material, and the laser sintered material comprises a stainless steel, or a nickel-chromium alloy.

16. The system of claim 12, wherein each impingement stream is directed at a substantially perpendicular angle toward the heated structure.

17. A method comprising:
additively manufacturing an impingement sleeve in a build direction, wherein the impingement sleeve comprises:
an outer surface;
a plurality of ports extending from the outer surface at angles greater than 45 degrees relative to the build direction, wherein each port of the plurality of ports is configured to direct an impingement stream toward a heated structure; and
a plurality of pins, wherein each pin of the plurality of pins is disposed along a respective pin axis within a threshold support angle of the build direction, each pin of the plurality of pins is coupled to at least one port of the plurality of ports, and each pin of the plurality of pins is configured to support the at least one port during additive manufacturing; and
inserting the additively manufactured impingement sleeve in a nozzle of a gas turbine.

18. The method of claim 17, comprising removing one or more pins of the plurality of pins prior to inserting the additively manufactured impingement sleeve in the nozzle of the gas turbine.

19. The method of claim 18, comprising removing each pin of the plurality of pins prior to inserting the additively manufactured impingement sleeve in the nozzle of the gas turbine.

20. The method of claim 17, wherein each port of the plurality of ports extends at least 0.5 of a diameter of the respective port from the outer surface.

* * * * *